Patented July 8, 1924.

1,500,670

UNITED STATES PATENT OFFICE.

MELVIN DE GROOTE, OF PITTSBURGH, PENNSYLVANIA.

MAKING DILUTE PERMANENT TURBID EMULSIONS.

No Drawing. Application filed March 17, 1923. Serial No. 625,899.

*To all whom it may concern:*

Be it known that I, MELVIN DE GROOTE, a citizen of the United States, residing at Pittsburgh, county of Allegheny, State of Pennsylvania, have invented a new and useful Improvement in Making Dilute Permanent Turbid Emulsions, of which the following is a full, clear, and exact description.

The present invention relates to making dilute permanent turbid emulsions. It is particularly adapted for and will be described with a special reference to making cloudy or turbid beverages of the sweetened acidulated fruit flavored type, carbonated or non-carbonated. In making such beverages, I form an emulsion containing an insoluble liquid, preferably the flavoring oil, in which the liquid globules are of such small size as to remain in permanent suspension. A minimum amount of the turbidifying liquid commensurate with the flavor strength desired, may be used since a maximum turbidity is imparted due to the minuteness of the globules. The globules are of such small size as to have colloidal properties and remain in true suspension and do not separate out as a scum or sediment.

Sweetened acidified fruit flavored beverages are generally carbonated and are made in imitation of fruit juice beverages. They usually consist of a dilute water solution of sugar syrup, an acid such as citric acid, and a flavoring oil, such as oil of orange, oil of lemon, oil of limes, etc., together with artificial coloring material. In making these beverages it is desirable to get a cloudy or turbid appearance to simulate the beverages made from the natural fruit juices. It is highly desirable that they have a permanent turbidity and that on standing for the usual period from manufacture to consumption which may be two or three weeks, a scum shall not form. Also it is highly desirable that the whole of the oil of orange, oil of lemon, etc., should be used, including the terpenes.

The oils of lemon, orange, lime, etc., usually contain about ten percent of active flavoring materials and about ninety percent of relatively inert materials, principally terpenes. While the terpenes are relatively inert for flavoring as compared with the active flavoring materials, their removal causes an inferior flavor. The terpenes are very insoluble in water. The active flavor constituents, however, are soluble enough in the absence of the terpenes so that they will dissolve in sweetened acidulated carbonated water in amounts sufficient to impart a flavor and, if properly prepared, without causing turbidity. In the past, it has been generally customary to separate the active flavoring materials from the terpenes by making a so-called soluble extract directly, or making a so-called terpeneless oil of lemon, lime, orange, etc., which was dissolved in an alcohol solution and added to the beverage, forming a clear beverage in which the flavoring material was in a true solution. These beverages were non-turbid. The flavor was relatively inferior to that which might be obtained by using the fruit oil containing the terpenes.

It has been proposed to get the full flavor of the fruit by using the whole oil containing the terpenes, dissolved in a 85% or 90% alcohol solution. However, when this alcoholic tincture is added to the beverage syrup, the oil separates out and forms an oily layer or scum.

Attempts have been made to form emulsions of the flavoring oils. These emulsions however, while turbid or cloudy immediately after manufacture, have formed scum at the surface within a day or two after bottling. This scum is highly objectionable from a sales standpoint. Moreover, in making these emulsions the flavoring oil has not been so finely dispersed as to impart the degree of turbidity desired by some manufacturers, so that the turbidity has been increased by adding a tincture of an insoluble gum, such as gum benzoin. This however did not dimish the forming of the scum at the surface in the bottles, and in fact greatly increases it. These beverages are characterized by the fact that the flavoring oil is in a comparatively coarse physical suspension or emulsion and that they are scum-forming. They may also form sediment at the bottom. They however have the advantage of the superior flavor due to the whole terpene-containing flavoring oil.

Attempts have been made to eliminate the scum which was formed by the rising to the surface of the emulsified flavoring oil, by using a terpeneless extract together with an added or extraneous turbidifying agent, such as gum benzoin. This is usually added in the form of an alcoholic tincture, which on dilution in water causes the separation of the gum benzoin in fine, solid particles which impart a cloudy appearance.

The flavor of such beverages is much inferior because of the use of a terpeneless extract, and furthermore because tincture of gum benzoin, even in minor quantities such as employed, has a characteristic medicinal taste and imparts to the product a medicinal or drug-like taste and covers up the fine aroma of the fruit. Further objections are that terpeneless citrus oils are not only much more expensive even in proportion to the amount used, than the ordinary oils, but they also require the use of an alcoholic tincture of the gum benzoin. This brings the manufacture of the product within the jurisdiction of Federal inspection and handicaps the actual manufacturing operations. Finally, various municipal and state authorities have objected to the use of an artificial clouding agent in beverages, and laws are now under way tending to the prohibition of the sale of such products when clouded with artificial clouding agents.

I have discovered a process whereby a non-scumming turbid beverage may be formed containing the whole flavoring oil. While the present process has been developed and will be described with particular reference to the manufacture of turbid sweetened acidified carbonated beverages, it will be understood that the invention is not so limited, but may be otherwise applied in making permanent dilution emulsions in which the emulsified liquid will not separate but remain in a state of permanent cloudy or turbid dispersion, without scumming.

The application of the invention to the manufacture of cloudy beverages of the type above mentioned will now be described in detail. In making such beverages according to my process a mixture is made preferably of five parts of sugar syrup, preferably invert cane sugar syrup such as that sold commercially as "Nulomoline T. P.", five parts of glycerine and one part of water. Then there is added to the mixture, an aqueous solution of substantially chemically pure sodium oleate (soap) in amount equal to about one percent of the mixture, together with a quantity of the flavoring oil such as oil of lemon, orange, lime, etc., equal to approximately one-half the quantity of the original invert sugar and glycerine mixture. Instead of adding the oil as such to the mixture, the oil may be dissolved in alcohol and the alcoholic solution added to the syrup. The mixture is then vigorously agitated preferably in a closed vessel containing an atmosphere of some inert gas, such as carbonic acid gas, nitrogen, hydrogen, etc. The inert gas is preferably used to keep the air from being carried in solution in the product which would cause a chemical combination between the atmospheric oxygen and the terpenes in the flavoring oil. These terpenes, if oxidized, form oxygenated products having an objectionable turpentine-like flavor and odor. The thorough agitation while forming an emulsion, does not usually emulsify the oil into particles smaller than approximately five microns. The oil particles of this size if present in the beverage will rise to the surface and form a scum or oil film.

I mechanically break up these oil particles into very much smaller oil particles, probably in the neighborhood or less than one micron in diameter. These fine oil particles or globules will remain in a permanent suspension in water solution provided the oil does not exceed about three-tenths of one percent by volume of the water. In the resultant beverage the amount of flavoring oil does not exceed this limit so that the oil particles remain in a truly permanent suspension or emulsion. The oil particles are of course of a liquid insoluble in the beverage. The citrus oils, such as oil of lemon, orange, lime, etc., contain, as above noted, about ten percent of flavoring constituents which go into true solution in the extreme dilution of the oil in the beverage and about ninety percent of terpenes which are substantially water insoluble in the dilutions here contemplated. If, however, an increased quantity of the oil is used and the amount of soluble flavoring materials, as indicated by the ten percent of citrus oils, is greater than the amount that can go into solution, then this excess flavoring material will be insoluble and act just as the terpenes. The insoluble oil particles impart to it the desired turbidity or cloudy appearance closely simulating the cloudy appearance due to the natural fruit juices. Moreover, because of the extremely fine dispersion of the oil particles, a minimum amount of oil will give the maximum turbidity. The oil droplets are sufficiently small so as to be invisible with a microscope of a three-hundred diameters magnification and I believe that they have in the neighborhood of two-tenths of a micron diameter. Oil particles of this size have the Brownian movement and consequently must remain in a permanent suspension without separating out as a scum, or oil film.

While it is preferred to utilize the terpene-containing flavoring oil as the turbidifying insoluble liquid, it is possible to make a turbid beverage or other emulsion by using some tasteless or inert material or oil such as citrus oil terpenes, oleic acid, etc., as the turbidifying agent. A water soluble flavoring may be used with such inert turbidifying oil to produce a turbid beverage. If a degree of cloudiness is desired greater than that obtainable with the desired amount of flavoring oil, some inert oil may be used in addition to cause a more turbid appearance.

I prefer to use a ball mill to mechanically break up the oil particles in the coarse emulsion which was formed by agitation, into particles fine enough to remain in permanent suspension in water solution. While a ball mill is preferred, other means may be employed such as a tube mill or devices in which the mixture is run between grinding surfaces which break up the oil particles, or the mixture may be run through an exceedingly fine orifice, as in a homogenizing machine, to reduce the size of the oil particles. To reduce the particle size, whether by the ball mill or some other process, a crushing or hammer like force is desirably employed. The ordinary agitator simply gives a mixing action. If a high powered motor driven whipping machine, such as is used in the baking trades, is employed, and by increasing the sugar content, and replacing the glycerol by polyglycerol, which is substantially a solid, the viscosity of the emulsion is greatly increased, it is possible within practical limits to obtain a crushing action in this class of whipping machines and eliminate the ball mill. In case of emulsions of ordinary viscosity, agitators or similar devices in which the liquid is whipped or beaten will not serve to give the necessarily fine dispersion, since the resistance of an oil globule to being broken up increases enormously with the diminution in size of the globule.

The term "ball mill" as herein employed is intended as a term of general description and not limitation and to include the general type of mills in which loose pieces such as pebbles, balls, rods or other shapes are tumbled so as to impact against each other.

The agitated mixture is run into a ball mill which is driven from twelve hours to a week, depending upon the flavoring oil, constituents of the mixture, the degree of fineness of the dispersion, etc.

While a very fine dispersion may be obtained by running a mixture of sugar syrup, glycerine and flavoring oil through the ball mill, the action of the ball mill is greatly assisted by the soap (sodium oleate) which apparently acts as a protective colloid to prevent coalescence of the finely divided oil droplets.

An atmosphere of inert gas such as carbon dioxid, hydrogen or nitrogen should be maintained in the ball mill to prevent oxidation of the terpenes in the flavoring oil.

I have found that my process may be employed for making permanently suspended emulsions of insoluble liquids or fixed oils, such as cod liver oil or the mineral oils. The use of a protective colloid, such as soap, is of advantage. Also in the case of emulsifying a fixed oil such as cod liver oil, an inert atmosphere should be maintained in the ball mill so as to prevent rancidity. The process may be used for forming oil emulsions such as used for insecticides, sprays, etc., or for making emulsions for lubricating compositions, soluble cutting oils, etc., or generally for any purpose in which it is desirable to reduce an insoluble substance, such as an oil, to a fine state of subdivision.

In using a ball mill the solution treated should be viscous enough to coat and cling to the balls, as the viscosity of the liquid apparently serves to hold the oil globules so that they may be split by the impact or grinding action on them of the balls, pebbles or other bodies in the tumbling mill.

The mixture of sugar syrup, glycerine and flavoring oil containing the small percentage of soap is then drawn from the dispersing device and is added to the larger volume of sugar syrup which is employed in making the beverage. This sugar syrup is the usual sugar syrup employed for this purpose and usually consists of cane or beet sugar of about six and a half or seven pounds to the gallon. Approximately one-half an ounce to one ounce of the emulsion is added to each gallon of the sugar syrup preferably at about 50° C. and then after agitating, about one and a quarter ounces of a fifty percent citric acid water solution is added. The mixture is again thoroughly agitated for approximately one-half hour, the temperature being maintained at about 50° C. The purpose of maintaining this temperature is to produce a relatively rapid reaction between the citric acid and the sodium oleate (soap). These react to form sodium citrate and oleic acid. The sodium citrate is a salt subject to true ionic or molecular dispersion the same as the sugar or citric acid. The oleic acid is an insoluble liquid which becomes finely dispersed in droplets similar to those of the flavoring oil, and tends to increase the turbidity of the resultant beverage. The amount of citric acid present in solution is several times the amount necessary to complete the chemical reaction with the sodium oleate but since the solutions are so dilute the temperture previously mentioned is desired. As a matter of fact, the reaction will complete itself at a cooler temperature but may require several days or weeks.

The final syrup thus formed and which is shipped to the bottler is preferably saturated to a slight degree with an inert gas to prevent oxidation. This syrup is usually diluted with about five to seven parts by volume of plain or carbonated water to make the final beverage.

The beverage thus made has the superior flavor due to the use of the whole oil, that is, the oil containing the terpenes as well as the flavoring constituents. The beverage has the desired cloudiness or turbidity. It is non-scumming and will stand for days or weeks in its original condition and without separation of the dispersed oil, or colloid. It is substantially free from solid colloids or solid substances in suspension. While it is possible to hold an insoluble liquid in a state of permanent suspension by reducing the size of the droplets to a diameter of about a micron or less, a solid cannot thus be held in suspension in an acidulated sweetened carbonated aqueous solution in the presence of a dispersed liquid phase without scumming. For this reason attempts to make beverages turbid by the use of solid colloids or insoluble solids, not of colloidal size, have not resulted in success and the solid colloids or other insoluble solids have, on standing for some days, formed scum.

In order to remove any insoluble solids which might form scum or sediment in the beverage, it is preferable to filter the syrup before shipping it to the bottler or mixing it with the water to form the beverage. Since the oil has been reduced to droplets of such small size, it is possible to filter out any solids without removing the finely dispersed oil from the syrup.

In order to prevent formation of insoluble solids or solid colloids it is important in the process above outlined to use sodium oleate substantially free from compounds of the solid fatty acids.

In the process as above described the final product was free from solid colloids (and by a solid colloid I mean any colloid which in its anhydrous state at ordinary temperatures and pressures is a solid) by the reaction between the citric acid and the sodium oleate whereby the sodium oleate was converted into sodium citrate which is a crystal and into oleic acid which is a liquid. Sodium citrate is a solid, but it undergoes ionic or molecular dispersion.

As a refinement in the process above outlined, I may add to the syrup before it is acidulated, a soluble calcium salt such as calcium chlorid. This reacts with the sodium oleate to form insoluble calcium oleate which may be removed by filtration before the syrup is acidified with citric acid. The removal of the oleate prevents any possibility of the reverse reaction taking place between the oleic acid and the sodium citrate to re-form sodium oleate which, since it is a solid colloid, might re-form and cause a scum at the surface.

In the foregoing description, the solid colloid was employed as the protective colloid to assist in the dispersion of the dispersed liquid, the solid colloid being converted into a liquid or being removed. Instead of employing a solid colloid, a liquid colloid may be employed, in which case, the liquid colloid may remain in the final product. As an example of such liquid protective colloid, a sulphuric acid derivative of oleic acid may be used. Such sulphuric acid derivative may be made by taking oleic acid, free from solid fatty acids, and treating it at 15° C. or less with about one-fifth its volume of concentrated sulphuric acid for three hours, with the addition of one part water after the reaction is completed. The sulpho-oleate thus formed is filtered. It is water soluble but not oil soluble. The solution of the sulphuric acid derivative with oleic acid contains one part of water in seven volumes of the oil. If desired, for academic purposes, this water may be separated by freezing and filtration below zero degrees C. The water remains in the filter as ice crystals, and the anhydrous sulphuric acid derivative of the oleic acid comes through as a liquid even at this low temperature. This state of being a liquid is unusual for a colloid and differentiates it from the commoner colloids that are usually used in emulsification and as protective colloids. This sulphuric acid derivative of oleic acid may be used in making sweetened acidulated beverages as follows:

One part water is mixed with ten parts invert sugar syrup and the hydrated sulphuric acid derivative of oleic acid, prepared as previously outlined, is added in an amount equivalent to three percent of the mixture. The mixture is now agitated in a baker's whipping machine, and the citrus oil or other insoluble oil or liquid added slowly in an amount equivalent to fifty percent by volume of the previous mixture of syrup, water and oleic acid derivative. The emulsion, after dispersion is completed, is added to sugar syrup in the same amount as previously noted, that is one-half ounce to one ounce per gallon of syrup. Acidification and color are the same as before.

There is no need to employ temperatures above room temperature, in so far as there is no need to promote any reaction between the liquid colloid and the citric acid. No further steps need be taken to eliminate this liquid colloid. This sulphuric acid derivative of oleic acid remains in the finished beverage and produces a change in surface tension so as to cause a desired amount of foaming and beading. It also acts as a protective colloid to keep the oil globlues from growing larger and also to hold them in suspension, even though they may be larger than particles ordinarily subjected to Brownian movements.

I prefer to use carbonic acid in the agitator to prevent oxidation of the flavoring oil.

It should be noted that in replacing the mixture of glycerine and cane sugar syrup by invert sugar syrup, when changing over to the use of the sulphuric acid derivative of oleic acid, that the viscosity of the subsequent emulsion is a great deal higher than in the case of soap, and for this reason, it is possible to obtain suitable dispersion without the use of the ball mill. Furthermore, it should be noted that in the case of the ball mill and in the employment of soap, the colloid is entirely removed from the final beverage, and therefore, the oil globules themselves must be reduced to such a size as to show an active Brownian movement which is about three-tenths of a micron. In the case of the use of the sulphuric acid derivatives, the colloid being a liquid, remains in solution and stabilizes or acts as a protective agent for the oil globules, and therefore, it is not necessary that the oil globules be dispersed as finely as before. Furthermore, it should be noted that the viscosity of the mixture when used in the whipping machine, is so heavy that it could not be used in the ball mill because it would cause the pebbles to adhere to each other and prevent the desired crushing action.

Instead of using soap as the protective colloid, various colloidal inorganic solids may be employed such as magnesium carbonate or iron hydroxid, since these materials will subsequently combine with citric acid to form soluble crystalline solids capable of true solution. In order to eliminate the presence of a solid colloid, a mixture of sodium phosphate and potassium bicarbonate may be used in the ball mill with the glycerine invert sugar syrup. Such a mixture, although not strictly a colloid, will assist in the fine dispersion of the oil in the ball mill to form the permanent turbid emulsion.

Moreover, the class of materials known as semi-colloids may be employed to assist in the dispersion. For instance, albumen which is a colloid, may be digested with pepsin to form a secondary colloid known as peptone. This substance partakes of some of the properties of a colloid and some that are not. It will act as a protective colloid in the ball mill but at the same time it will diffuse through a parchment membrane. Peptone, however, if used in this process will cause scumming. However if peptone is hydrolized by any of the well known methods, such as use of an acid or a base or an enzyme, it will be converted into a product known as peptide. Peptide may be even further converted into a simpler amino body compound. This amino body compound can be used as a protective colloid in the process as outlined and will not cause scumming because it does not have properties sufficiently resembling solid colloids.

A protective colloid may be used which can be converted into an insoluble form and removed from the syrup by filtration. An example of this is a soap which may or may not contain compounds of solid fatty acids. The fatty acids may be converted into calcium salts by the addition of a soluble calcium salt and removed. Instead of the soap, gelatine may be used as a protective colloid, and then after the ball mill operation it may be coagulated with a small amount of formaldehyde and removed by filtration. An important point to note is that the final product should be free of such materials as are ordinarily known as solid colloids and also from insoluble solids which will separate from the acidulated sweetened carbonated beverage to form the objectionable scum.

Solids may occur as crystals, capable of ionic or molecular dispersion, such as sodium citrate or sugar. There is no objection to this class of solids in the final non-scumming beverage. Solids may occur as insoluble material such as stearic acid, too large in particle size to be deemed as colloidal, or else solids may be colloids, such as soap, gelatine, gum acacia, etc. These substances should be eliminated from or converted into acceptable forms and cannot be permitted in appreciable quantities in the finished beverage. Liquids may occur as liquid crystals such as glycerine, capable of molecular dispersion, or ionic dispersion. They may occur as insoluble liquids such as oleic acid or the terpenes. They may occur as the liquid colloids such as the sulphuric acid derivative of oleic acid. There is no objection to any of these three forms in the final beverage.

The beverage herein described is a non-scumming suspension or emulsion in a dilute water dilution of an insoluble dispersed liquid phase (flavoring or turbidifying oil) in a liquid dispersing phase (water) in the absence of solid colloids (such as soap, gums, etc.). Such suspension may be had in the absence or in the presence of liquid colloids, such as the sulphuric acid derivative of oleic acid.

The syrup as made by my process may be used by the manufacturer or the bottler for making the beverage, the beverage being delivered to the customer in bottled form. The syrup may also be delivered to soda fountains in syrup form, being drawn and mixed at the soda fountain with carbonated water to make the beverage for immediate consumption by the customer. It is important that the syrup as delivered to the soda fountain retain the turbidifying liquid or oil in permanent suspension in the sugar syrup, since if it separates and forms an oil layer or scum the soda fountain proprietor or druggist will regard it as inferior. The turbidifying liquid as dispersed by my process will remain in permanent suspension and will not separate from the syrup. While the finely dispersed flavoring oil produces the desired turbidity in the water dilution forming the beverage as consumed, it produces a substantially clear syrup. The flavoring oils have approximately the same index of refraction as the sugar syrup; therefore, finely divided particles held in suspension in the sugar syrup do not cause a turbid appearance in the sugar syrup, which is a highly desirable condition, since the druggist or soda fountain proprietor prefers to get a clear syrup. Where added turbidifying agents, such as gum acacia or gum benzoin are employed, they give an undesirable cloudy or murky appearance to the syrup.

While I have described my invention with particular relation to certain beverages, it is to be understood that the invention within the scope of the broader claims is not so limited but may be otherwise embodied.

I claim:

1. As a new article of manufacture, a turbid non-scumming acidulated sweetened beverage containing a water insoluble liquid in sufficiently fine dispersion to remain in permanent suspension, substantially as described.

2. As a new article of manufacture, a turbid non-scumming acidulated sweetened beverage containing a terpene-containing flavoring oil in sufficiently fine dispersion to remain in permanent suspension, substantially as described.

3. As a new article of manufacture, a turbid non-scumming acidulated sweetened beverage containing sugar syrup, an acid and a flavoring oil in sufficiently fine dispersion to remain in permanent suspension, and substantially free from scum-forming solid colloids, substantially as described.

4. As a new article of manufacture, a turbid non-scumming acidulated sweetened beverage containing a water insoluble liquid in permanent suspension in presence of a liquid colloid, substantially as described.

5. As a new article of manufacture, a turbid non-scumming acidulated sweetened beverage containing a flavoring oil including insoluble terpene constituents in sufficiently fine dispersion to remain in permanent suspension in presence of a liquid colloid, substantially as described.

6. As a new article of manufacture, a syrup for making turbid acidulated sweetened beverages, containing sugar syrup, an acid and a water insoluble liquid in sufficiently fine dispersion to remain in permanent suspension therein, substantially as described.

7. As a new article of manufacture, a syrup for making turbid acidulated sweetened beverages, containing sugar syrup, an acid and a flavoring oil in sufficiently fine dispersion to remain in permanent suspension therein, substantially as described.

8. In a new article of manufacture, a syrup for making turbid acidulated sweetened beverages, containing sugar syrup, an acid, a liquid colloid and a water insoluble liquid in sufficiently fine dispersion so as to remain in permanent suspension, substantially as described.

9. In a new article of manufacture, a substantially clear syrup for making turbid acidulated sweetened beverages, containing sugar syrup, an acid and a water insoluble liquid having an index of refraction approximating that of the syrup, said liquid being in sufficiently fine dispersion to remain in permanent suspension, substantially as described.

10. A dilute non-scumming suspension of an insoluble dispersed liquid phase in a liquid dispersing phase and in the absence of a solid colloid, substantially as described.

11. A dilute non-scumming suspension of an insoluble dispersed liquid phase in a liquid dispersing phase and in the absence of a solid colloid, but in the presence of a liquid colloid, substantially as described.

12. That step in the process of making turbid non-scumming acidulated sweetened beverages which consists in dispersing a water insoluble liquid into particles which cause a turbid appearance in the beverage and which are sufficiently fine to remain in permanent suspension, substantially as described.

13. Those steps in the process of making turbid acidulated sweetened beverages which consist in dispersing an insoluble liquid in the presence of a solid colloid to a sufficiently fine dispersion to remain in permanent suspension, and thereafter eliminating the solid colloid, substantially as described.

14. Those steps in the process of making turbid acidulated sweetened beverages which consist in dispersing a water insoluble liquid in the presence of a soap to a sufficiently fine dispersion to remain in permanent suspension, and thereafter breaking down the soap, substantially as described.

15. That step in the process of making a syrup to be used in the manufacture of turbid acidulated sweetened beverages, which consists in dispersing in a sugar syrup a water insoluble liquid to a sufficiently fine dispersion to remain in permanent dispersion therein and to produce a turbid appearance upon dilution to the final beverage, substantially as described.

In testimony whereof I have hereunto set my hand.

MELVIN DE GROOTE.